(12) United States Patent
Kluth et al.

(10) Patent No.: US 11,124,167 B2
(45) Date of Patent: Sep. 21, 2021

(54) CIRCUIT AND DISTRIBUTOR BLOCK AND BRAKE CONTROL ASSEMBLY FORMED THEREFROM FOR RAIL VEHICLES, AND DISTRIBUTOR SET FOR CONFIGURING PURPOSES AND METHOD FOR CREATING THE BRAKE CONTROL ASSEMBLY

(71) Applicant: SIEMENS AKTIENGESELLSCHAFT, Munich (DE)

(72) Inventors: Wolfgang Kluth, Altdorf (DE); Stefan Reinicke, Ilmmuenster (DE)

(73) Assignee: Siemens Mobility GmbH, Munich (DE)

( * ) Notice: Subject to any disclaimer, the term of this patent is extended or adjusted under 35 U.S.C. 154(b) by 357 days.

(21) Appl. No.: 16/073,458

(22) PCT Filed: Jan. 3, 2017

(86) PCT No.: PCT/EP2017/050064
§ 371 (c)(1),
(2) Date: Jul. 27, 2018

(87) PCT Pub. No.: WO2017/129380
PCT Pub. Date: Aug. 3, 2017

(65) Prior Publication Data
US 2019/0381983 A1  Dec. 19, 2019

(30) Foreign Application Priority Data

Jan. 27, 2016  (DE) ..................... 10 2016 000 760.5

(51) Int. Cl.
*B60T 13/66* (2006.01)
*B60T 13/36* (2006.01)
(Continued)

(52) U.S. Cl.
CPC ............ *B60T 13/665* (2013.01); *B60T 13/36* (2013.01); *B60T 13/365* (2013.01); *B60T 15/021* (2013.01); *B60T 17/04* (2013.01)

(58) Field of Classification Search
CPC ........ B60T 13/662; B60T 17/221; B60T 8/17; B60T 8/885; B60T 17/22; B60T 8/36;
(Continued)

(56) References Cited

U.S. PATENT DOCUMENTS 3,244,193 A * 4/1966 Loveless ................. F15B 13/06
137/454.6
3,504,704 A * 4/1970 Beckett ................... F16K 11/22
137/625.64
(Continued)

FOREIGN PATENT DOCUMENTS

DE  19715528 A1  11/1997
DE  29704307 U1  5/1998
(Continued)

OTHER PUBLICATIONS

English translation of de 19715528a1 (Year: 1997).*

*Primary Examiner* — Robert A. Siconolfi
*Assistant Examiner* — Mahbubur Rashid
(74) *Attorney, Agent, or Firm* — Laurence A. Greenberg; Werner H. Stemer; Ralph E. Locher

(57) ABSTRACT

A circuit has a fluid line matrix and brake components connected to the fluid line matrix. Changes in the brake designs or brake functions can be carried out easily in that at least one interface is provided for connecting a distributor block. The interface is designed such that a configuration of the fluid line matrix can be formed by connecting or exchanging the distributor block. There is also described a distributor block which is suitable for forming a configura-
(Continued)

tion of the fluid line matrix of the circuit by connecting to the at least one interface of the circuit.

6 Claims, 8 Drawing Sheets

(51) Int. Cl.
   *B60T 15/02* (2006.01)
   *B60T 17/04* (2006.01)
(58) Field of Classification Search
   CPC ........ B60T 13/66; B60T 13/683; B60T 15/00;
         B60T 8/3685; B60T 13/147; B60T
         13/665; B60T 13/74; B60T 17/04; B60T
         8/327; B60T 13/167; B60T 13/268; B60T
         13/36; B60T 15/027; B60T 15/14; B60T
         2270/608; B60T 8/3605; B60T 8/362;
         B60T 8/3675
   USPC .............................................. 341/24, 26, 34
   See application file for complete search history.

(56) References Cited

U.S. PATENT DOCUMENTS

| | | | | |
|---|---|---|---|---|
| 3,589,387 | A * | 6/1971 | Raymond | F15B 13/0817 |
| | | | | 137/261 |
| 4,230,143 | A * | 10/1980 | Dettmann | A61C 1/0038 |
| | | | | 137/270 |
| 4,377,183 | A * | 3/1983 | Johansson | F15B 11/044 |
| | | | | 137/606 |
| 4,382,452 | A * | 5/1983 | Loveless | F16K 3/28 |
| | | | | 137/625.43 |
| 4,509,556 | A * | 4/1985 | Scanlon | F15B 13/0807 |
| | | | | 137/884 |
| 4,574,844 | A * | 3/1986 | Neff | F15B 11/044 |
| | | | | 137/625.65 |
| 4,682,822 | A * | 7/1987 | Brecht | B43L 13/045 |
| | | | | 188/164 |
| 4,709,724 | A * | 12/1987 | Williams | F16K 11/0716 |
| | | | | 137/596 |
| 5,032,951 | A | 7/1991 | Schropp et al. | |
| 5,301,717 | A * | 4/1994 | Goedecke | F15B 13/0839 |
| | | | | 137/269 |
| 5,988,766 | A * | 11/1999 | McCurdy, Jr. | B60T 13/665 |
| | | | | 303/15 |
| 6,086,163 | A * | 7/2000 | Klink | B60T 17/043 |
| | | | | 303/128 |
| 6,098,006 | A | 8/2000 | Sherwood et al. | |
| 6,135,574 | A * | 10/2000 | Pettit | B60T 13/665 |
| | | | | 303/15 |
| 6,173,731 | B1 * | 1/2001 | Ottliczky | F15B 13/0817 |
| | | | | 137/271 |
| 6,234,201 | B1 * | 5/2001 | Strobel | F15B 11/044 |
| | | | | 137/596 |
| 6,302,149 | B1 * | 10/2001 | Sato | F15B 13/0817 |
| | | | | 137/269 |
| 6,324,063 | B1 | 11/2001 | Mohler | |
| 6,453,936 | B1 * | 9/2002 | Frank | B60T 8/323 |
| | | | | 137/315.03 |
| 6,817,247 | B1 * | 11/2004 | Hilberer | B60T 8/3675 |
| | | | | 73/714 |
| 7,052,095 | B2 * | 5/2006 | Roether | F16K 37/0041 |
| | | | | 251/129.15 |
| 7,151,432 | B2 * | 12/2006 | Tierling | B60G 17/0523 |
| | | | | 280/124.16 |
| 7,194,345 | B2 * | 3/2007 | Heer | F16K 31/02 |
| 7,344,145 | B2 * | 3/2008 | Duchet | B60G 17/0523 |
| | | | | 137/899.4 |
| 7,849,880 | B2 | 12/2010 | Herges | |
| 8,190,328 | B2 * | 5/2012 | Jovers | B60G 17/0523 |
| | | | | 701/37 |
| 8,231,397 | B2 * | 7/2012 | Ottliczky | H01R 27/02 |
| | | | | 439/192 |
| 8,844,573 | B2 | 9/2014 | Mann et al. | |
| 8,869,951 | B2 | 10/2014 | Stoff | |
| 9,010,785 | B2 * | 4/2015 | Gocz | B60G 17/0523 |
| | | | | 280/124.16 |
| 9,676,378 | B2 * | 6/2017 | Kiel | F16K 31/02 |
| 2001/0003289 | A1 * | 6/2001 | Mead | F15B 13/0821 |
| | | | | 137/884 |
| 2002/0186666 | A1 * | 12/2002 | Hassel | B01J 4/008 |
| | | | | 370/257 |
| 2004/0051381 | A1 * | 3/2004 | Garner | F15B 13/0857 |
| | | | | 307/11 |
| 2004/0141853 | A1 * | 7/2004 | Duchet | B60T 17/18 |
| | | | | 417/282 |
| 2004/0145237 | A1 * | 7/2004 | Duchet | F15B 13/0832 |
| | | | | 303/127 |
| 2005/0231026 | A1 * | 10/2005 | Barberis | B60T 17/083 |
| | | | | 477/198 |
| 2006/0151035 | A1 * | 7/2006 | Karcher | B60G 17/0523 |
| | | | | 701/37 |
| 2006/0284480 | A1 * | 12/2006 | Rudolph | B60T 13/261 |
| | | | | 303/127 |
| 2007/0131294 | A1 * | 6/2007 | Zub | F15B 13/0814 |
| | | | | 137/884 |
| 2007/0270006 | A1 | 11/2007 | Herges | |
| 2009/0280959 | A1 * | 11/2009 | Bensch | B60T 17/083 |
| | | | | 477/198 |
| 2010/0038571 | A1 * | 2/2010 | Frank | F16K 37/0041 |
| | | | | 251/129.15 |
| 2011/0209787 | A1 | 9/2011 | Mann et al. | |
| 2011/0273004 | A1 | 11/2011 | Mann et al. | |

FOREIGN PATENT DOCUMENTS

| | | |
|---|---|---|
| DE | 19908617 A1 | 9/2000 |
| DE | 102008009217 A1 | 8/2009 |
| EP | 0025626 A1 | 3/1981 |
| EP | 0338259 A2 | 10/1989 |
| EP | 0829404 A1 | 3/1998 |
| RU | 2520188 C2 | 6/2014 |
| WO | 2006045489 A1 | 5/2006 |
| WO | 2010034476 A1 | 4/2010 |
| WO | 2010034477 A1 | 4/2010 |

* cited by examiner

CIRCUIT AND DISTRIBUTOR BLOCK AND BRAKE CONTROL ASSEMBLY FORMED THEREFROM FOR RAIL VEHICLES, AND DISTRIBUTOR SET FOR CONFIGURING PURPOSES AND METHOD FOR CREATING THE BRAKE CONTROL ASSEMBLY

BACKGROUND OF THE INVENTION

Field of the Invention

The invention pertains to the field of brake operation, in particular of rail vehicle brake control.

The invention relates to a circuit having a fluidic line matrix and having brake components connected to the fluidic line matrix.

The publication DE 199 08 617 A1 discloses a brake panel for performing brake control for locomotives. Here individual modules are disposed adjacently in a kind of panel and the brake components of a respective module are pneumatically connected in a defined functional relationship to a functional unit by means of a line matrix. The modules for their part have corresponding sides assigned to one another and/or optionally activatable access openings on front sides for establishing connections between the modules, said connections being establishable by direct assignment using seals or by separate line connections. Changes to a particular module, which may be necessary for changing the braking concept or the braking function of the module or also for changing the basic braking concept or basic braking function of the brake panel as a whole, here require at least reconstruction of the functional unit of the respective module and of the module's line matrix in which said functional unit is incorporated.

Proceeding therefrom, the object of the invention is to enable changes in braking concept or braking function to be implemented more easily.

SUMMARY OF THE INVENTION

This object is achieved by a circuit having the features as claimed, which circuit is provided with at least one interface for connecting a distributor block, wherein the interface is designed such that a configuration of the fluidic line matrix can be implemented by connecting or exchanging the distributor block.

It is regarded as advantageous here if the at least one interface is implemented by connections of the fluidic line matrix.

It is also regarded as advantageous if the fluidic line matrix is constituted by a brake panel, particularly in the form of a pipe panel or a bore panel or an adhesive panel, wherein the at least one interface with its connections is implemented on one of the sides, in particular on the front or rear side, of the brake panel.

It is also regarded as advantageous if, in addition to the connections constituting the at least one interface, the fluidic line matrix also has connections for connecting the brake components, wherein the connections for connecting the brake components are each implemented on one of the sides, in particular on the front side, of the brake panel.

In addition, it is regarded as advantageous if, in addition to the connections constituting the at least one interface, the fluidic line matrix also has connections for connecting connecting lines assigned to the circuit, wherein the connections for connecting connecting lines assigned to the circuit are each implemented on one of the sides of the brake panel.

The object of the invention is also achieved by a distributor block having the features as claimed, which distributor block, by connection to the at least one interface of the circuit as claimed, is suitably designed to implement a configuration of the fluidic line matrix of the circuit.

It is particularly advantageous if the distributor block is implemented as a passive component—i.e. if the distributor block has no control function.

The distributor block is preferably produced in one piece, in particular by a 3D printing process. Produced in one piece is to be understood as meaning that it is made either as a single part or that—if it made from a plurality of parts—its parts are inseparably interconnected, e.g. bonded, to form one piece.

The object of the invention is also achieved by a distributor set having the features as claimed, comprising at least two distributor blocks as claimed which are suitable for implementing at least two configurations of the fluidic line matrix.

For a circuit as claimed, it is advantageous if each of the distributor blocks has, incorporated in the distributor block, a duct matrix having ports for connection to assigned connections of the fluidic line matrix of the circuit.

To implement preferred braking concepts or more specifically braking functions, it is regarded as advantageous if, for each of the distributor blocks, at least two of the ports are connected via a connecting duct of the duct matrix and, for at least one of the distributor blocks, two other of the ports are connected via another connecting duct of the duct matrix or at least one other of the ports is made blind, in particular connected to a blind duct of the duct matrix.

The object of the invention is also achieved by a brake control assembly, in particular for rail vehicles, having the features as claimed, said brake control assembly being provided with a circuit as claimed and at least one distributor block as claimed and for which the at least one distributor block is connected to the at least one interface of the circuit, whereby a configuration of the fluidic line matrix of the circuit is implemented by the at least one distributor block.

It is regarded as advantageous if a first interface and a first distributor block connected to the first interface are implemented as mutually assigned means of providing a configuration of flow paths for the pressurized air provided by a brake air reservoir as supply air.

It is also regarded as advantageous if a second interface and a second distributor block connected to the second interface are implemented as mutually assigned means of providing a configuration of flow paths for the pressurized pilot control air provided by a control valve.

It is also regarded as advantageous if a third interface and a third distributor block connected to the third interface are implemented as mutually assigned means of providing a configuration of flow paths for pressurized air which is provided as supply air for connected controllers and/or brake pressure regulators.

It is also regarded as advantageous if a fourth interface and a fourth distributor block connected to the fourth interface are implemented as mutually assigned means of providing a configuration of at least one other flow path for pressurized air which is provided as supply air for connected controllers and/or brake pressure regulators.

The invention also relates to a rail vehicle having a brake control assembly according to the invention, wherein it is regarded as advantageous if the brake control assembly is implemented as part of a brake equipment panel, in particular as a module of a brake equipment panel.

The invention also relates to a method for creating a brake control assembly for rail vehicles, said method having the features as claimed, wherein at least one distributor block as claimed is connected to the at least one interface of a circuit as claimed and whereby a configuration of the fluidic line matrix of the circuit is implemented by the distributor block.

The at least one distributor block is selected from the distributor set as claimed prior to connection to the at least one interface.

BRIEF DESCRIPTION OF THE SEVERAL VIEWS OF THE DRAWING

The invention will now be explained in greater detail with reference to the accompanying drawings in which FIG. 1 schematically illustrates a detail of a rail vehicle having an electropneumatic brake equipment panel as part of a unit for controlling brake cylinder pressures.

DESCRIPTION OF THE INVENTION

Figure 1:
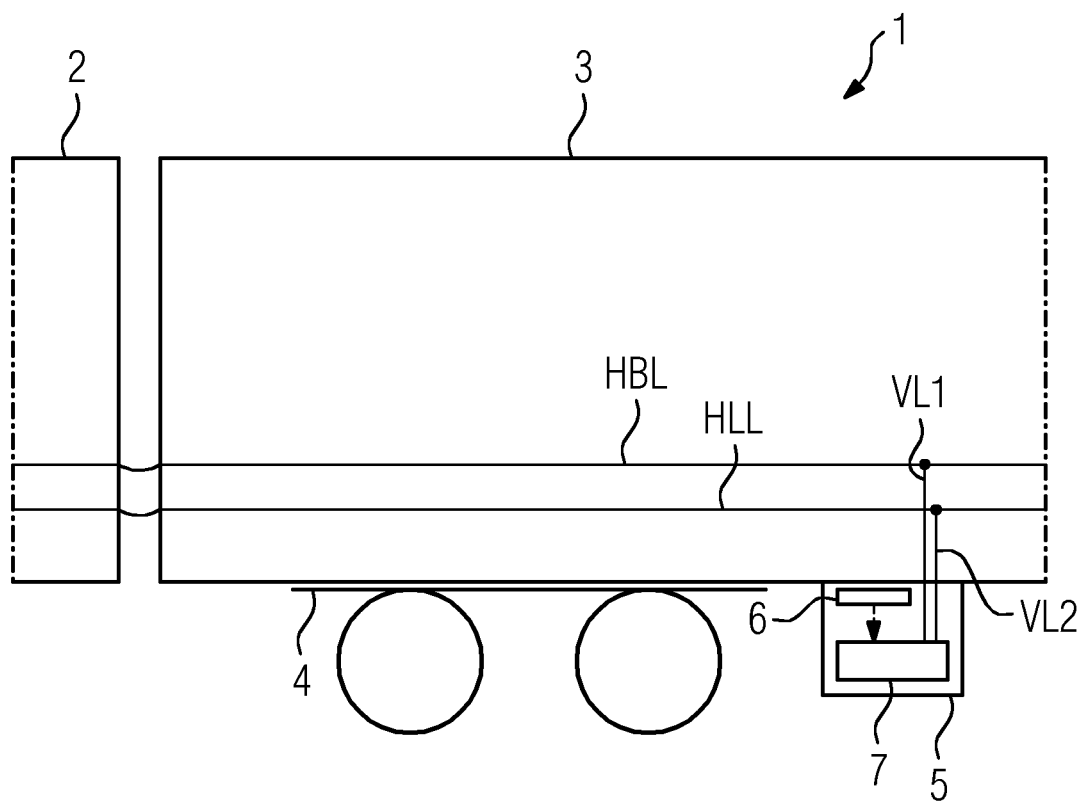

The detail of a rail vehicle 1 according to the invention as shown in FIG. 1 shows part of a power car 2 and part of a trailer car 3. In the detail shown, 4 denotes a wheel truck of the trailer car and 5 a unit 5 of the trailer car, said unit 5 being used to control brake cylinder pressures of brake cylinders (not shown in FIG. 1) of the trailer car 3.

The brake cylinder pressures of the brake cylinders of the trailer car 3 are preferably controlled on a wheel truck by wheel truck basis if the rail vehicle 1 is a high-speed train.

Alternatively, the brake cylinder pressures of the brake cylinders of the trailer car 3 can be controlled on a car by car basis, preferably if the rail vehicle 1 is a commuter or local train.

A main air line HLL and a main reservoir air line HBL run through the cars 2, 3 of the rail vehicle 1.

The unit 5 for controlling brake cylinder pressures has an electronic brake control equipment assembly 6 and a brake equipment panel 7, wherein the brake control equipment assembly 6 is used to control electrically controllable components of the brake equipment panel 7.

The brake equipment panel 7 is connected to the main air line HLL by means of a connecting line VL1 and to the main reservoir air line HBL by means of a connecting line VL2.

As will be shown below with reference to FIGS. 3 to 6, in different embodiments which are provided for different car types (trailer car, power car, etc.) or different rail vehicle types (high-speed train, commuter train, local train, etc.), the brake equipment panel 7 consists of a plurality of modules in each case. Said FIGS. 3 to 6 show, by way of example, only four of the embodiments which are denoted by 107, 207, 307 and 407 respectively.

Figure 2:
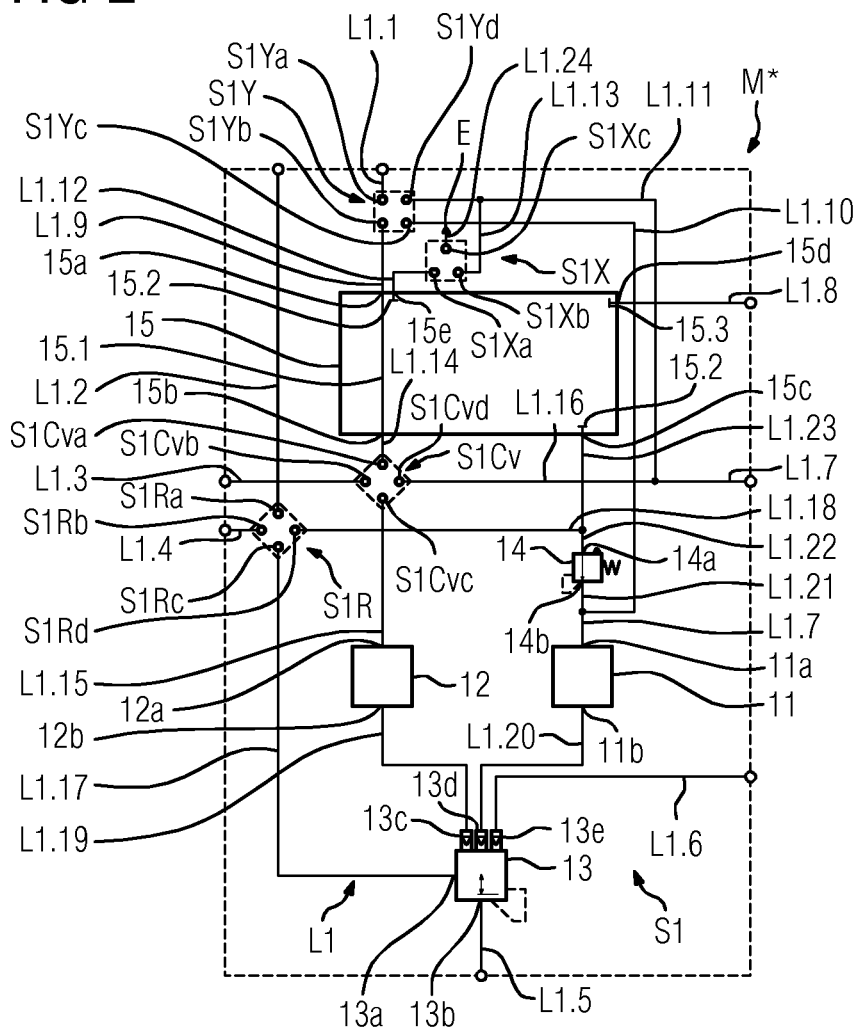
FIG. 2 shows a configuration-ready basic module for the brake equipment panel as shown in FIG. 1 comprising an inventive circuit which has a fluidic line matrix and brake components connected to the fluidic line matrix.

For the embodiments 107, 207, 307 and 407 of the brake equipment panel 7 that are shown, a module (a brake control assembly) is implemented as a module configuration $KM1.R_iY_jCv_kX_l$ of the basic module M1* shown in FIG. 2 in each case. For the embodiment 207 shown in FIG. 4, another module M1 is implemented as a module configuration of the basic module M1*.

As shown in FIG. 2, the basic module M1* has a circuit S1 on the basis of which different module configurations of the basic module M1* can be implemented by means of different sets of distributor blocks $R_i$, $Y_j$, $Cv_k$ and $X_l$. The distributor blocks will be referred to hereinafter as "configurators".

When used for a particular design of the rail vehicle 1, the different module configurations of the basic module M1* are part of a directly acting brake system. Each $KM1.R_iY_jCv_kX_l$ of the shown module configurations of the basic module M1* will hereinafter also be referred to as "Module_Direct_Brake". In FIGS. 3 to 6, the Module_Direct_Brake is provided with the reference character M1 in each case.

As shown in FIG. 2, the circuit S1 has a fluidic line matrix L1 in the form of a pneumatic line matrix comprising line sections L1.1 to L1.24, wherein the free end of the line section L1.24 is implemented with a vent E into the atmosphere.

The circuit S1 also comprises brake components 11, 12, 13, 14, 15 which are connected to connections (not indicated here) of the fluidic line matrix L1 by means of connections 11a, 11b, 12a, 12b, 13a to 13e, 14a, 14b and 15a to 15e. The brake component 11 is a first directly acting brake pressure regulator. The brake component 12 is a second directly acting brake pressure regulator. The brake component 13 is a first relay valve acting as a pressure intensifier. The brake component 14 is a pressure reducing valve, in particular for supplying air to the first brake pressure regulator 11 or for supplying air to both brake pressure regulators 11, 12. The brake component 15 is a blind/bypass plate, having a pneumatic bypass line which connects the connections 15a and 15b and having three pneumatic stub lines which are connected to the connections 15c, 15d and 15e.

The circuit S1 also has an interface S1R for connecting a distributor block $R_i$, an interface S1Y for connecting a distributor block $Y_j$, an interface S1Cv for connecting a distributor block $Cv_k$ and an interface S1X for connecting a distributor block $X_l$.

The interfaces S1R; S1Y; S1Cv and S1X are designed such that, by connecting or exchanging the distributor blocks $R_i$, $Y_j$, $Cv_k$, $X_l$, a configuration $KL1.R_iY_jCv_kX_l$ of the fluidic line matrix L1 and therefore a configuration $KM1.R_iY_jCv_kX_l$ of the at least one module M1 can be implemented. Each of said interfaces S1R; S1Y; S1Cv or S1X is implemented by a number of fixed connections of the fluidic line matrix L1.

By being connected to the assigned interfaces, distributor blocks Ri, Yj, Cvk, Xl are accordingly suitable for implementing a configuration KLi.RiYjCvkXl of the fluidic line matrix of the circuit.

Thus the first interface S1R is implemented by the connections S1Ra, S1Rb, S1Rc and S1Rd. The second interface S1Y is implemented by the connections S1Ya, S1Yb, S1Yc and S1Yd. The third interface S1Cv is implemented by the connections S1Cva, S1Cvb, S1Cvc and S1Cvd. And the fourth interface S1X is implemented by the connections S1Xa, S1Xb and S1Xc.

The fluidic line matrix L1 of the circuit is constituted by a brake panel, in particular in the form of a pipe panel or a bore panel or an adhesive panel (also known as a milled panel), so that the position of the line matrix and in particular the position of its connections is permanently predefined.

The interfaces S1R; S1Y; S1Cv and S1X with their connections are implemented on the front side of the brake panel. Alternatively, however, it could also be provided that the interfaces are implemented on another side—e.g. on the back of the brake panel.

Connections (not indicated here) for connecting the brake components are also disposed on the front of the brake panel. Alternatively these can also be implemented on another side of the brake panel.

Connections (not indicated further here) for the connection of connecting lines assigned to the circuit are also disposed on the sides of the brake panel, which connections will hereinafter also be referred to as line connections—to differentiate them from the connections of the interfaces and the connections for the brake components.

FIGS. 7 to 10 show four distributor sets R; Y; Cv; X for implementing different module configurations.

A particular distributor set R; Y; Cv; or X consists of at least two distributor blocks which are suitably designed to implement two different configurations of the fluidic line matrix L1 and/or another fluidic line matrix L1 of another circuit S1 (cf. FIG. 4). The distributor sets are therefore not only used to configure the line matrix of one circuit S1, but also to configure a fluidic line matrix L constituted by a plurality of interconnected fluid line matrices L1, L1 of a plurality of circuits S1, S1.

Thus the distributor set R consists of distributor blocks $R_i$ where i=1 to nR—i.e. of a number nR of distributor blocks, wherein here, by way of example, nR=4. The distributor set R is suitably designed to implement the different configurations $KL1.R_1Y_jCv_kX_l, \ldots, KL1.R_{nR}Y_jCv_kX_l$.

The distributor set Y consists of the distributor blocks $Y_j$ where j=1 to nY (wherein here, by way of example, nY=2) and is suitably designed to implement the different configurations $KL1.R_iY_1Cv_kX_l, \ldots, KL1.R_iY_{nY}Cv_kX_l$.

The distributor set Cv consists of the distributor blocks $CV_k$ where k=1 to nCv (wherein here, by way of example, nCv=3) and is suitably designed to implement the different configurations $KL1.R_iY_jCv_1X_l, \ldots, KL1.R_iY_jCv_{nCv}X_l$.

And the distributor set X consists of the distributor blocks $X_l$ where l=1 to nX (wherein here, by way of example, nX=2) and is suitably designed to implement the different configurations $KL1.R_iY_jCv_kX_l, \ldots, KL1.R_iY_jCv_kX_{nx}$.

In the case of a particular distributor set R; Y; Cv; or X, each of the distributor blocks has, incorporated in the distributor block, a duct matrix having a number of ports which are assigned to the connections of the interfaces.

Thus, in the case of the distributor set R, each of the distributor blocks $R_i$ where i=1 to nR has, incorporated in the distributor block, a duct matrix $KR_i$ comprising the ports $KR_ia$, $KR_ib$, $KR_ic$ and $KR_id$, wherein the ports $KR_ia$, $KR_ib$, $KR_ic$ and $KR_id$ and the connections S1Ra, S1Rb, S1Rc and S1Rd are assigned pairwise to one another.

In the case of the distributor set Y, each of the distributor blocks $Y_j$ where j=1 to nY has, incorporated in the distributor block, a duct matrix $KY_j$ comprising the ports $KY_ja$, $KY_jb$, $KY_jc$ and $KY_jd$, wherein the ports $KY_ja$, $KY_jb$, $KY_jc$ and $KY_jd$ and the connections S1Ya, S1Yb, S1Yc and S1Yd are assigned pairwise to one another.

In the case of the distributor set Cv, each of the distributor blocks $Cv_k$ where k=1 to nCv has, incorporated in the distributor block, a duct matrix $KCv_k$ comprising the ports $KCv_ka$, $KCv_kb$, $KCv_kc$ and $KCv_kd$, wherein the ports $KCv_ka$, $KCv_kb$, $KCv_kc$ and $KCv_kd$ and the connections S1Cva, S1Cvb, S1Cvc and S1Cvd are assigned pairwise to one another.

And in the case of the distributor set X, each of the distributor blocks $X_l$ where l=1 to nX has, incorporated in the distributor block, a duct matrix $KX_1$ comprising the ports $KX_la$, $KX_lb$ and $KX_lc$, wherein the ports $KX_la$, $KX_lb$ and $KX_lc$ and the connections S1Xa, S1Xb and S1Xc are assigned pairwise to one another.

Figure 11:
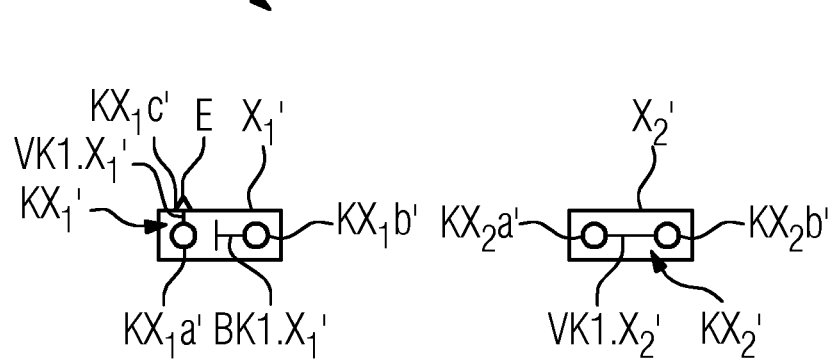
FIG. 11 shows an alternative embodiment for the distributor set as shown in FIG. 10.

Alternatively, in the case of the line matrix L1, the connection S1Xc and the line section L1.24 provided with the vent E can be dispensed with if the distributor set X' is used for configuring instead of the distributor set X. In the case of this distributor set, only the distributor block $X_1$ has a third port $KX_lc'$, said port $KX_lc'$ being provided with a vent E into the atmosphere as shown by way of example in FIG. 11.

For each of the distributor blocks $R_i$ where i=1 to nR; $Y_j$ where j=1 to nY; $Cv_k$ where k=1 to nCv; $X_l$ where l=1 to nX of a particular distributor set R; Y; Cv; X, at least two of the ports are connected via a connecting duct $VK1.R_i$; $VK1.Y_j$; $VK1.CV_k$; $VK1.x_1$ of the duct matrix, and for at least one of the distributor blocks $R_i$ where i=1 to nR; $Y_j$ where j=1 to nY; $Cv_k$ where k=1 to nCv; $X_l$ where l=1 to nX of a particular distributor set R; Y; Cv; X, two other of the ports are connected via another connecting duct of the duct matrix or at least one other of the ports is made blind, in particular connected to a blind duct of the duct matrix.

Each $R_i$; $Y_j$; $Cv_k$; $X_l$ of the distributor blocks is implemented as a passive component.

Each $R_i$; $Y_j$; $Cv_k$; $X_l$ of the distributor blocks is also produced as one piece, in particular by a 3D printing process.

To create a particular module configuration $KM1.R_iY_jCv_kX_l$ of the module M1, the distributor blocks $R_i$, $Y_j$, $Cv_k$ and $X_l$ are therefore first selected from the distributor sets R, Y, Cv and X. These are then connected to the assigned interfaces, thereby implementing the configuration $KL1.R_iY_jCv_kX_l$ of the fluidic line matrix.

Figure 3:
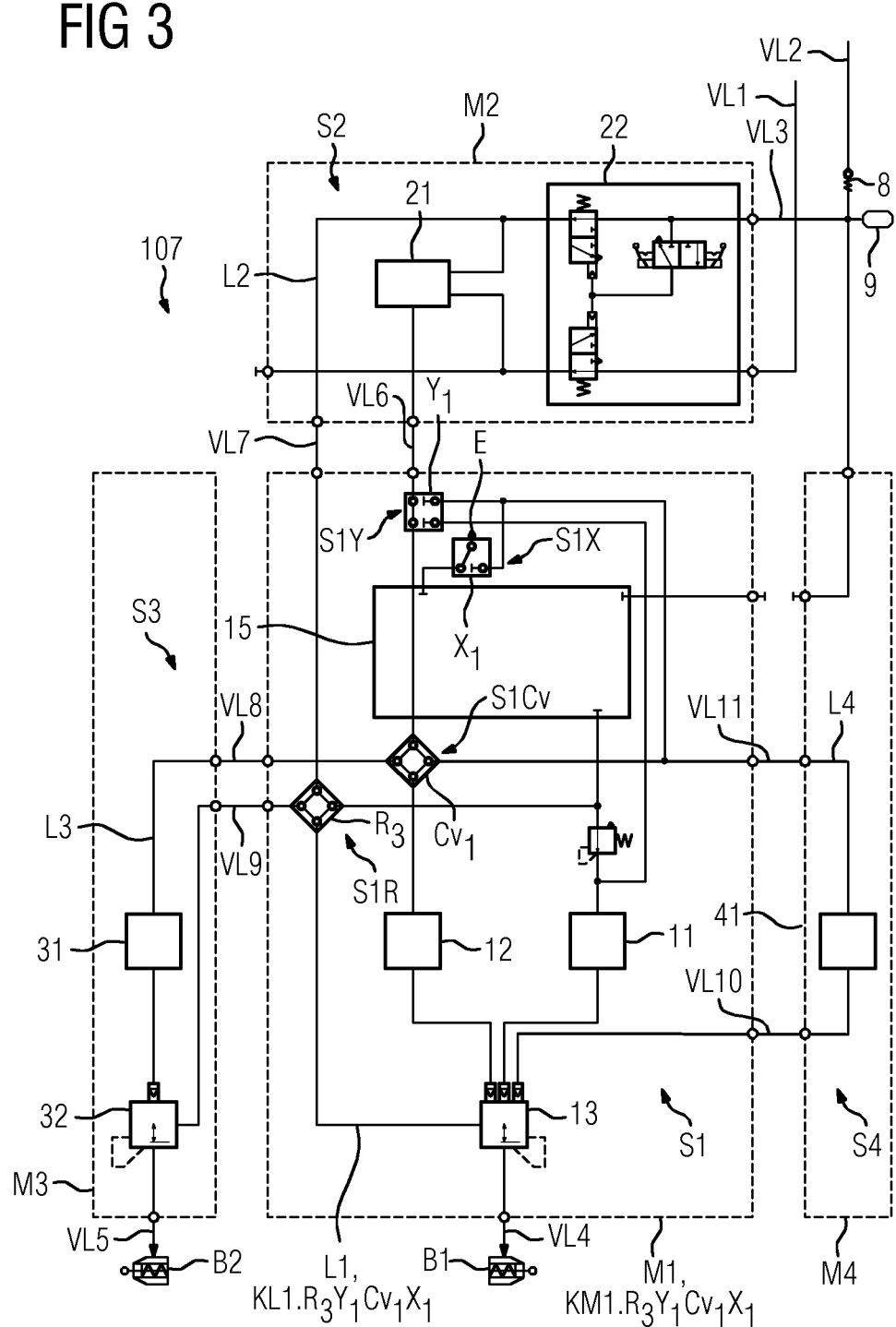
FIGS. 3 to 6 show four exemplary embodiments of the brake equipment panel formed from a plurality of modules, wherein configurations of a fluidic line matrix of at least one of the modules and therefore module configurations of the at least one module are created by means of sets of distributor blocks.

FIG. 3 shows a first configuration 107 of the brake equipment panel 7 which is constituted from four brake control assemblies in the form of electropneumatic modules M1, M2, M3, M4.

Each of the brake control assemblies (each of the modules M1; M2; M3 and M4) has a circuit S.M1; S.M2; S.M3 and S.M4 respectively comprising a fluid (here pneumatic) line matrix L.M1; L.M2; L.M3 and L.M4 respectively and brake components 11 to 15; 21 and 22; 31 and 32; 41 connected to the fluidic line matrix. The module M1 also has a first set of distributor blocks $R_3, Y_1, Cv_1$ and $X_1$ by means of which the fluidic line matrix L1 is configured—i.e. a first configuration $KL1.R_3Y_1Cv_1X_1$ of the fluidic line matrix L1 and therefore also a first module configuration $KM1.R_3Y_1Cv_1X_1$ of the module M1 is created.

The first configuration 107 of the brake equipment panel is connected to the main air line HLL by means of the first pneumatic connecting line VL1 which is connected to a line connection of the second module M2. The first configuration 107 of the brake equipment panel is also connected to the main reservoir air line HBL by means of a third pneumatic connecting line VL3 which connects a line connection of the second module M2 to the connecting line VL2. The connecting line VL2 incorporates a check valve 8. A brake air reservoir 9 is connected to the connecting line VL2 at a point downstream of the check valve 8.

A first brake cylinder B1 of the wheel truck is also connected to the brake equipment panel by means of a fourth pneumatic connecting line VL4 which is connected to a line connection of the first module M1, and a second brake cylinder B2 of the wheel truck is connected to the brake equipment panel by means of a fifth pneumatic connecting line VL5 which is connected to a line connection of the third module M3.

In addition, the line matrices L1 to L4 of the modules are connected by means of pneumatic connecting lines V6 to V11 in the manner shown in FIG. 3. Pipe connections of the line matrices L1 to L4 which are not connected to a connecting line are provided with seals.

The circuit S2 of the second module M2 contains the brake components 21 and 22. The brake component 21 is an indirectly acting controller in the form of a control valve which provides pressurized pilot control air which is also used as supply air. The brake component 22 is a shut-off device for the control valve 21.

The circuit S3 of the third module M3 contains the brake components 31 and 32. The brake component 31 is an additional directly acting controller. The brake component 32 is a relay valve.

The circuit S4 of the fourth module M4 contains the brake component 41. The brake component 41 is a directly acting emergency brake controller.

The first interface S1R of the line matrix L1 and a respective first distributor block $R_i$ connected to the first interface are designed as mutually assigned means of providing a configuration of flow paths for the pressurized air provided by the brake air reservoir 9 as supply air.

The second interface S1Y and a second distributor block $Y_j$ connected to the second interface are designed as mutually assigned means of providing a configuration of flow paths for the pressurized pilot control air provided by the control valve 22.

The third interface S1Cv and a third distributor block $CV_k$ connected to the third interface are designed as mutually assigned means of providing a configuration of flow paths for pressurized air which is provided as supply air for connected controllers and/or brake pressure regulators 11, 12, 31, 41.

The fourth interface S1X and a fourth distributor block $X_l$ connected to the fourth interface are designed as mutually assigned means of providing a configuration of at least one other flow path for pressurized air which is provided as supply air for connected controllers and/or brake pressure regulators 11, 12, 31, 41. When a shut-off device 16 as shown in FIGS. 5 and 6 is employed, they are used either to vent connected controllers and/or brake pressure regulators into the atmosphere in the case of shut-off or to connect them to other flow paths.

Figure 4:
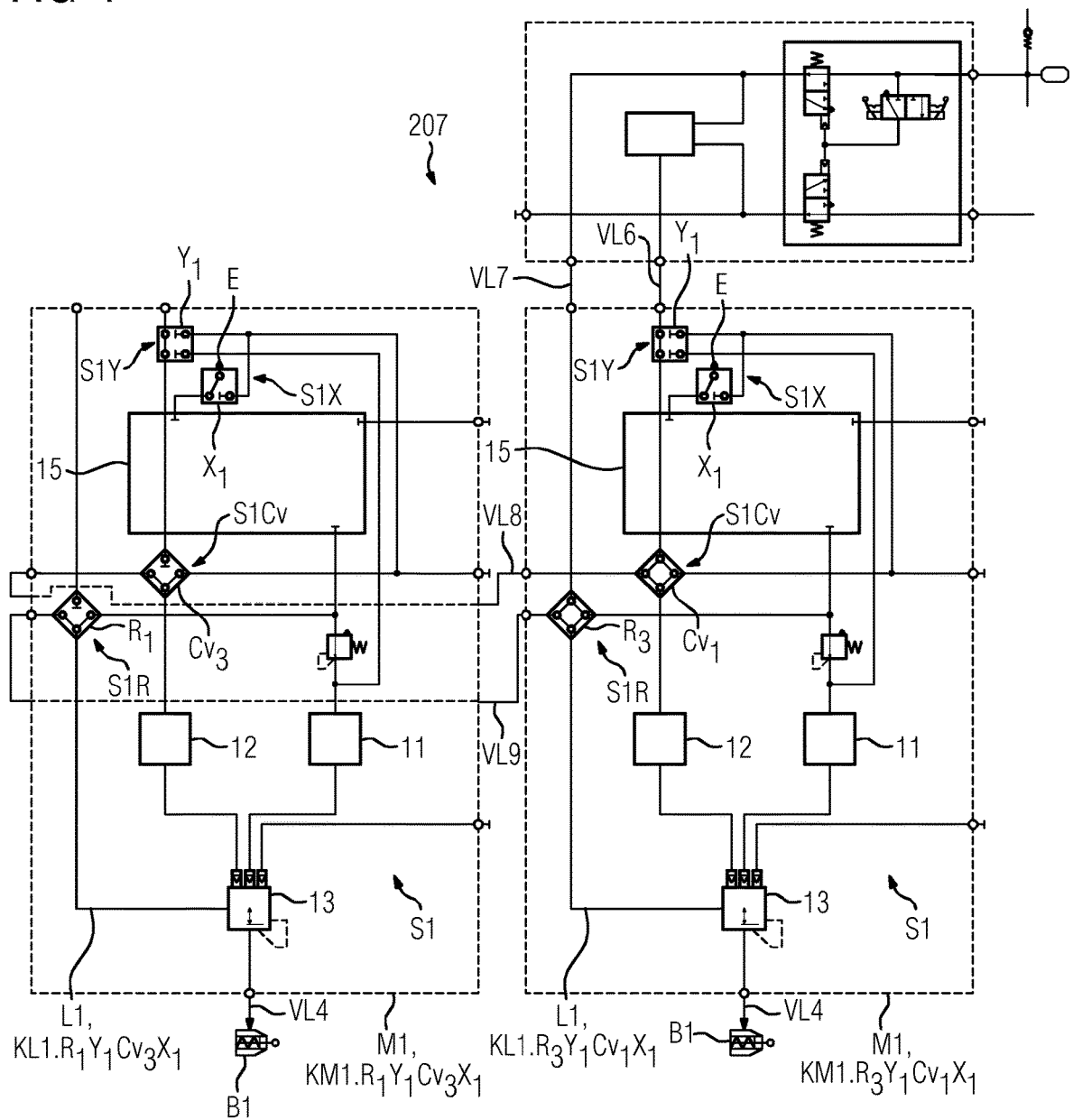

As shown in FIG. 4, two basic modules M1* can also be connected and configured by sets of distributor blocks.

Figure 5:
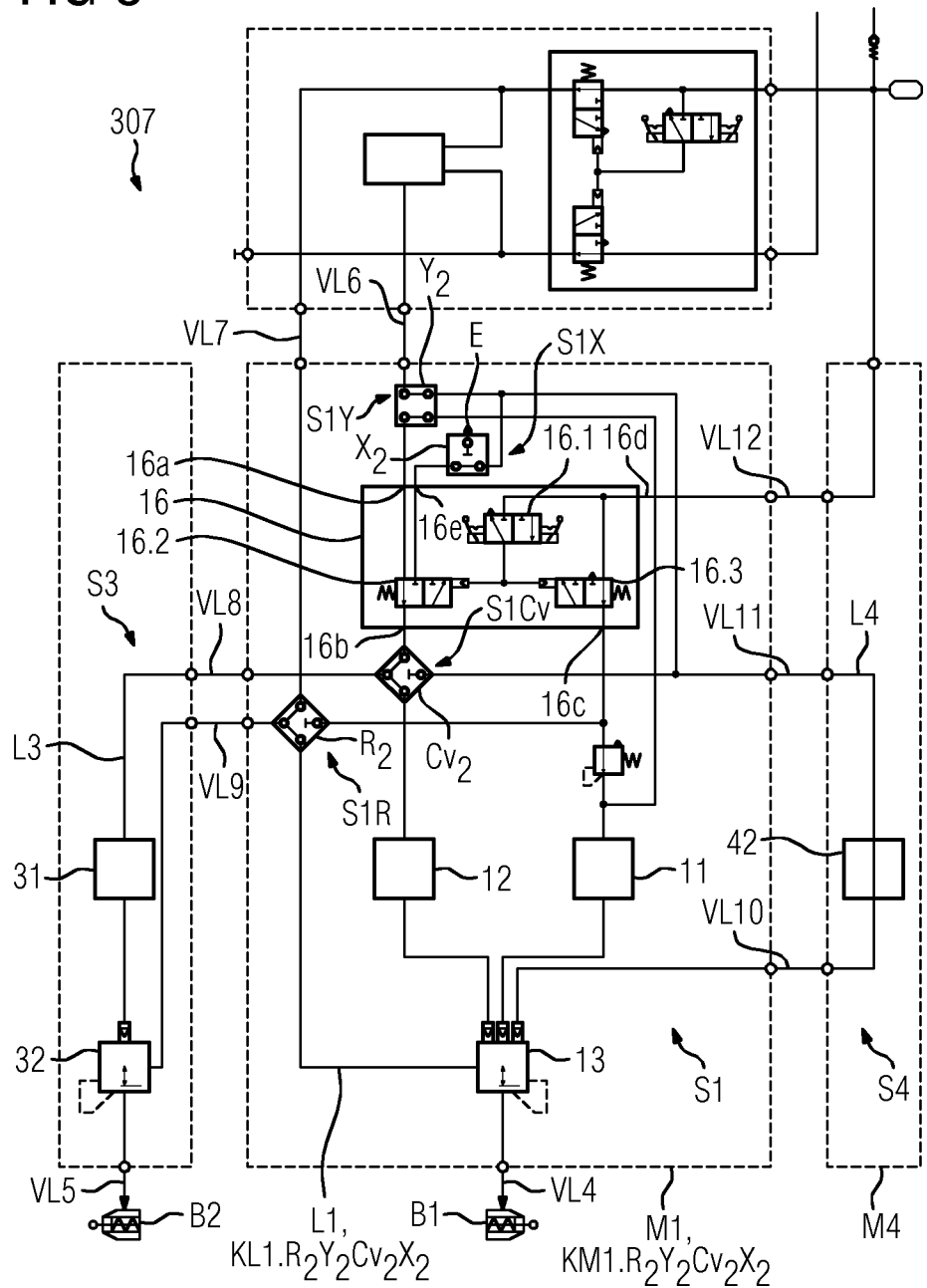

In addition, as illustrated in FIG. 5, the embodiment 207 in FIG. 3 can be modified by connecting, instead of the directly acting emergency brake controller, the brake component implemented as a bypass plate to the line matrix L4 and by connecting, instead of the blind/bypass plate 15, the brake component denoted by 16 to the line matrix L1, wherein the brake component 16 is a shut-off device. The configuration of the line matrix L1 then still required for creating the embodiment 307 takes place using the set of configurators $R_2$, $Y_2$, $Cv_2$, $X_2$ shown.

Figure 6:
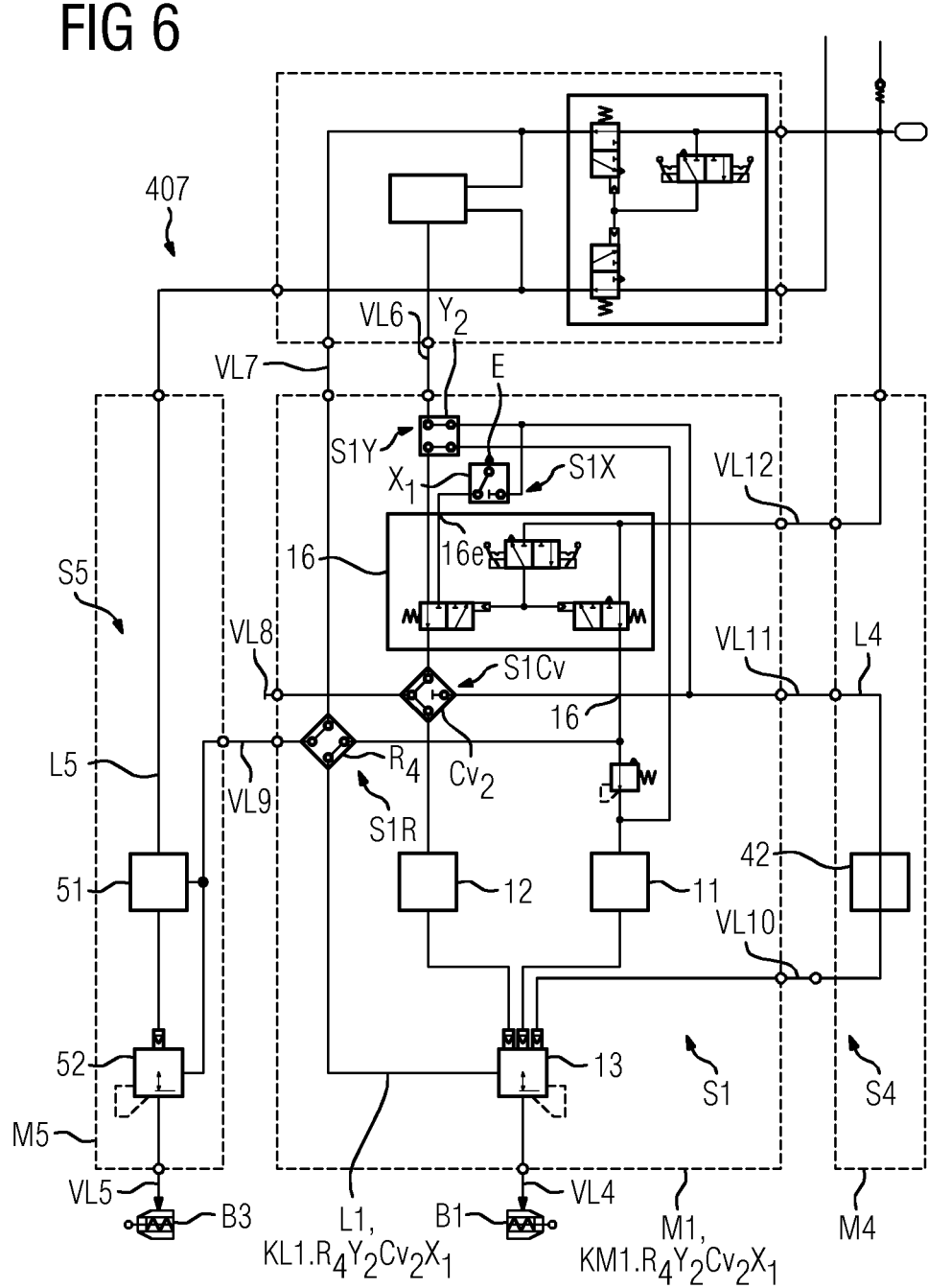
Figure 7:
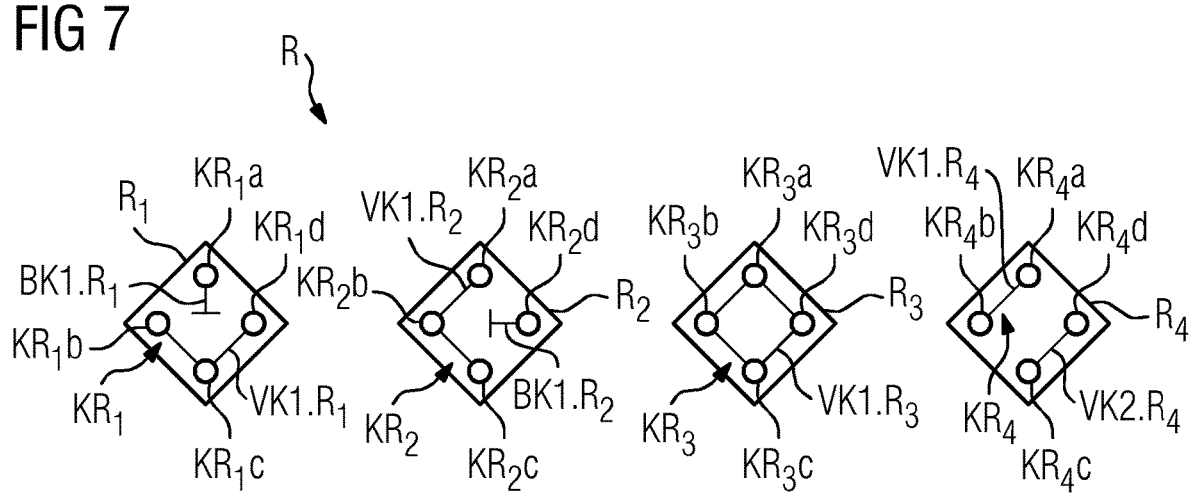
FIGS. 7 to 10 show four distributor sets for implementing different module configurations.
Figure 8:
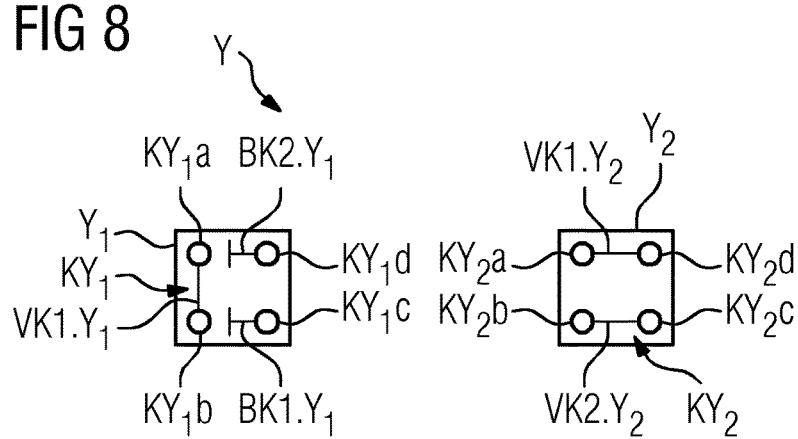
Figure 9:
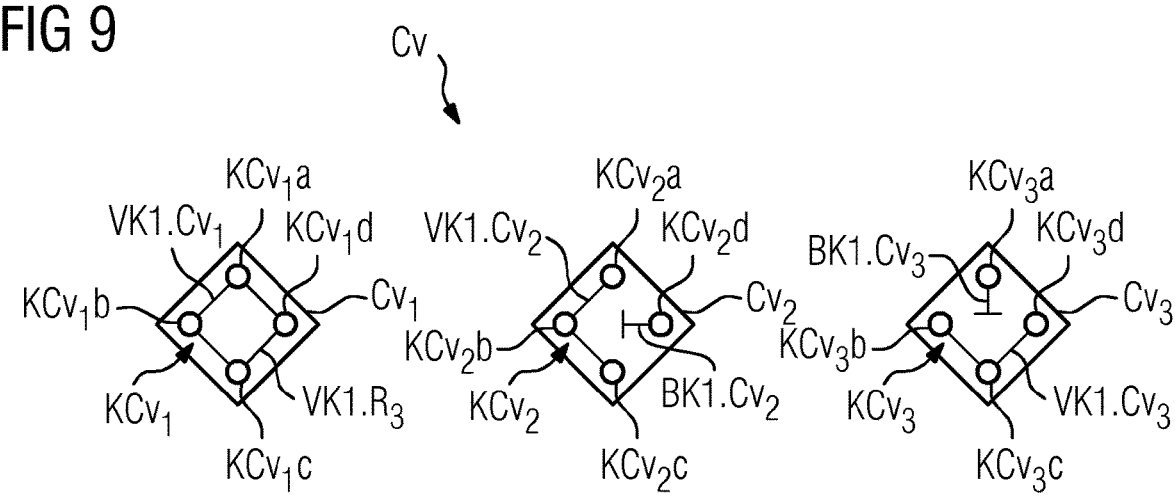
Figure 10:
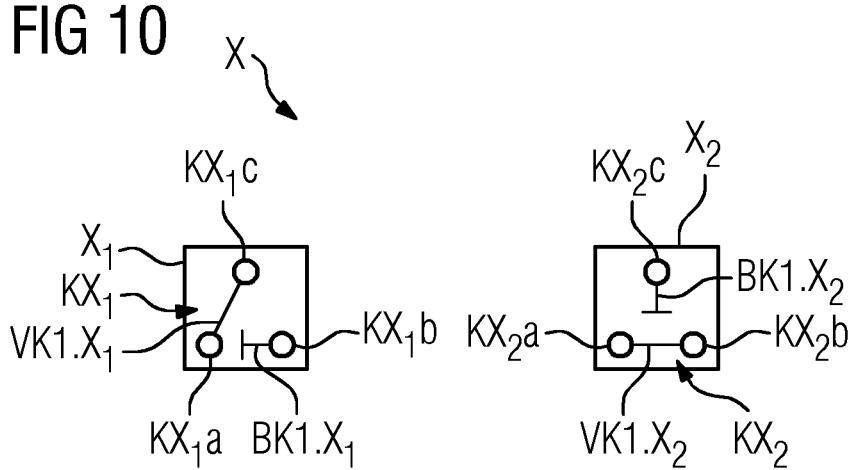

As illustrated in FIG. 6, the embodiment 307 shown in FIG. 5 can be modified by connecting, instead of the module M3, the module M5 to the module M1, wherein the module M5 comprises the brake components 51 and 52. The brake component 51 is an additional indirectly acting controller and the brake component 52 is a relay valve. The configuration of the line matrix L1 then still required for creating the embodiment 407 takes place using the set of configurators R4, $Y_2$, $Cv_2$, $X_1$ shown.

This shut-off device 16 has a both electrically and mechanically (manually) operated 3/2 directional control valve 16.1, two pneumatically operated 3/2 directional control valves 16.2 and 16.3 as well connecting lines not identified in greater detail here. By means of the connecting lines, an inlet of the 3/2 directional control valve 16.1 and inlets and outlets of the 3/2 directional control valves 16.2 and 16.3 are connected to connections 16a to 16e in the manner shown in FIGS. 5 and 6. The shut-off device 16 is connected to the line matrix L1 via these connections 16a to 16e. In addition, an outlet of the 3/2 directional control valve 16.1 and an outlet of the 3/2 directional control valve 16.3 are provided with venting into the atmosphere. The control inputs of the 3/2 directional control valves 16.2 and 16.3 are additionally connected to an outlet of the 3/2 directional control valve 16.1.

The distributor blocks (configurators) $R_i$; $Y_j$; $Cv_k$; $X_l$ of the distributor sets R; Y; Cv; X, are therefore used to implement electropneumatic brake control assemblies, in particular in the form of module configurations, which are designed to control air brakes for rail vehicles. The configuring serves the following purposes:

to change functions by altering the interconnections of modules and brake components,
to change the functional range, in particular to deactivate functions by pneumatic isolation of modules and components, and
to activate functions by pneumatically connecting modules and components.

The configurators are used for brake equipment panels or electropneumatic brake modules suitable for controlling air brakes on a car by car or wheel truck by wheel truck basis. The configurations support the interconnection of modules as shown by way of example in FIG. 2 for a wheel truck by wheel truck, directly acting brake. In the example shown in FIG. 2, the two modules acting as direct brakes can be interconnected. For this purpose, only corresponding configurators $R_3$, $Y_1$, $Cv_1$, $X_1$ and $R_1$, $Y_1$, $Cv_3$, $X_1$ are connected.

The distributor set R is used to configure the feeding, distribution and isolation of the supply air from the brake air reservoir. Its distributor blocks (configurators) have 4 ports. These configurators can be used to determine the shut-off device 22 or 16 via which the pressurized air supply of the relay valves 13, 32, 52, 14 or of the directly acting brake pressure regulators 11, 12 can be shut off.

The operation of the pneumatic configurators on the module M1 acting as a direct brake is described in FIGS. 3 to 6. The following possible configurations are shown by way of example:

In the case of the configuration shown in FIG. 3, all the relay valves 13 and 32 and the directly acting brake pressure regulator 11 are supplied with pressurized air via the shut-off device 22 assigned to the control valve 21.

In the case of the configuration shown in FIG. 5, all the relay valves 13, 32 are supplied with pressurized air via the shut-off device 22.

In the case of the configuration shown in FIG. 6, the optional additional indirect brake (i.e. the indirect controller 51 and the relay valve 52) are supplied with pressurized air via the shut-off device 22. The relay valve 13 is shut off via the shut-off device 16 assigned to the directly acting brake pressure controllers 11, 12.

The distributor set R or rather the use of its configurators offers the advantage that, for example, the following different concepts in respect of shut-off can be implemented:
- shut-off of the entire pneumatic brake of a car using the shut-off device 22 of the control valve 21 (cf. FIG. 3),
- shut-off of the entire pneumatic brake of a wheel truck using the shut-off device 22 of the control valve 21 (cf. FIG. 4),
- shut-off of the indirectly acting brake (selective) using the shut-off device 22 of the control valve 21 (cf. FIG. 6),
- shut-off of the directly acting brake (selective) using the shut-off device 16 of the directly acting brake pressure regulators (cf. FIG. 6),
- activation of towing mode for the directly acting brake using the shut-off device 16 of the directly acting brake pressure regulators (cf. FIG. 5)

The distributor set Cv, hereinafter also referred to as configurator Cv for supplying the open- and closed-loop control circuits, is used to configure, feed and distribute the supply air for the connected pneumatic open- or closed-loop control circuits. Its configurator possesses 4 ports. This configurator can be used to determine how the directly acting brake pressure regulators 11, 12 and the optional control circuits 31, 41 are supplied with pressurized air. The following configurations options exist:

In the case of the configurations shown in FIGS. 3 and 4, the optional additional directly acting controller 31, the directly acting brake pressure regulators 11, 12 and the directly acting emergency brake controller 41 are supplied via the configurator Y ("configurator pilot pressure control valve").

In the case of the configuration shown in FIG. 5, the optional additional directly acting controller 31 and the directly acting brake pressure regulator 12 are supplied by the configurator Y ("configurator pilot pressure control valve").

The distributor set Cv or rather the use of its configurator offers the advantage that, for example, the following diverse brake system architectures can be implemented:

On the one hand, a series connection of control valve 21 and directly acting brakes (cf. FIGS. 3 and 4):

Supplying of the directly acting brake pressure regulator 12 and the optional control circuits 31, 41 via the pilot pressure of a basic spring-loaded control valve 21. This produces a series connection of the control valve 21 and the directly acting brakes. The directly acting brakes constitute the main braking system during normal operation. The HLL is only filled in the case of towing, thereby automatically releasing the directly acting brakes. Towing is only done via the indirectly acting brake.

On the other hand, a parallel connection of control valve 21 and directly acting brakes (see FIGS. 5 and 6): The control valve 21 and the directly acting brakes are switched to the relay valve. The directly acting brakes constitute the main braking system. The indirectly acting brake is used for quick-action braking or for towing, i.e. recovering a defective train.

The distributor set Y, which has already been referred to here as "configurator pilot pressure control valve", is used to configure the feeding and distribution of the pilot pressure of the control valve 21. Its distributor blocks have 4 ports. When they are used, its configurators interoperate with the respectively used configurator of the distributor set Cv in order to implement the brake system architectures already mentioned above.

In the case of the configurations shown in FIG. 3, the optional additional directly acting controller 31, the directly acting brake pressure regulators 11, 12 and the directly acting emergency brake controller 41 are supplied via the pilot pressure of the control valve 21. This produces a series connection of the control valve 21 and the directly acting open- and closed-loop control circuits 31, 11, 12, 41 connected via the respective configurator $Y_j$.

In the case of the configurations shown in FIGS. 5 and 6, the optional additional directly acting controller 31 and the directly acting brake pressure regulator 12 are supplied via the pressure reducing valve 14 for supplying air to the brake pressure regulators.

The distributor set X, hereinafter also referred to as the "configurator for shut-off", is designed to configure the directly acting brake pressure regulators in the event of shut-off by means of the shut-off device 16. The configurators of this distributor set X possess three ports.

In the case of the configuration shown in FIG. 6, the connected control circuit 31 is vented on actuation of the shut-off device 16 ("shut-off device of the directly acting brake pressure regulators").

In the case of the configuration shown in FIG. 5, when the shut-off device 16 ("shut-off device of the directly acting brake pressure regulators") is actuated, the connected open- and closed-loop control circuits 12, 31 are connected to the pilot pressure of the control valve 21. This produces a series connection of the control valve 21 and the directly acting open- and closed-loop control circuits 12, 31 connected via the configurator X.

Through the use of the pneumatic configurators, the invention allows simple and cost-effective adjustment of the brake equipment panel and electropneumatic brake modules. The pneumatic configurators can both change the operation of electropneumatic brake modules and determine their interaction with other modules. The pneumatic configurators also enable the basic braking concept to be changed. Another advantage of the pneumatic configurators is that they enable standardized brake equipment panels and electropneumatic modules to be provided which can be adapted in respect of the desired pneumatic circuit without significant design modification. Standardized brake equipment panels and electropneumatic brake modules can be functionally modified by means of the pneumatic configurators without the need to question the validity of type testing; the individual configurations can be taken into account as early as the type testing stage.

The invention claimed is:

1. A brake control assembly comprising:
   a circuit having:
      a fluidic line matrix and brake components connected to said fluidic line matrix, said fluidic line matrix being a brake panel;
      at least one interface for connecting said distributor block to said fluidic line matrix, said at least one interface being implemented by connections of said fluidic line matrix, said connections of said at least one interface being implemented on a front side or a back side of said brake panel, said interface being formed to implement a configuration of said fluidic line matrix by connecting or exchanging the distributor block;
      said fluidic line matrix having further connections for connecting the brake components, said connections for connecting the brake components being formed on the front side of the brake panel;

a distributor set having:
two distributor blocks each for connection to the at least one interface of the circuit, each said distributor block being configured to implement a respective different configuration of flow paths of the fluidic line matrix of the circuit upon connection thereof to the at least one interface, the at least one interface being implemented by connections of the fluidic line matrix, wherein each of said distributor blocks has, incorporated in said distributor block, a duct matrix formed with ports for connection to respectively assigned connections of the fluidic line matrix of the circuit;

for each of said distributor blocks at least two of said ports being connected via a connecting duct of the duct matrix; and for at least one of said distributor blocks two other of said ports are connected via another connecting duct of the duct matrix or at least one other of said ports is a blind port connected to a blind duct of the duct matrix.

2. The brake control assembly according to claim 1, wherein:
said brake panel is selected from the group consisting of a pipe panel, a bore panel and an adhesive panel.

3. The brake control assembly according to claim 2, wherein, in addition to said connections forming said at least one interface, said fluidic line matrix also has connections for connecting connector lines assigned to the circuit, wherein said connections for connecting the connector lines are implemented on one of the front or back sides of the brake panel.

4. The brake control assembly according to claim 1, wherein the distributor block is configured as a passive component.

5. The brake control assembly according to claim 1, wherein the distributor block is produced in one piece.

6. A method for forming a brake control assembly, the method comprising:
providing a circuit having:
a fluidic line matrix and brake components connected to the fluidic line matrix, the fluidic line matrix being a brake panel;

at least one interface for connecting a distributor block to the fluidic line matrix, the at least one interface being implemented by connections of the fluidic line matrix, the connections of the at least one interface being implemented on a front side or a back side of the brake panel, the interface being formed to implement a configuration of the fluidic line matrix by connecting or exchanging the distributor block; and the fluidic line matrix having further connections for connecting the brake components, the connections for connecting the brake components being formed on a front side of the brake panel;

providing a distributor block for connection to the at least one interface of the circuit, the distributor block being configured to implement a configuration of flow paths of the fluidic line matrix of the circuit upon connection thereof to the at least one interface;

connecting the distributor block to the at least one interface of the circuit to thereby implement a configuration of the fluidic line matrix of the circuit by way of the distributor block;

selecting the distributor block from a distributor set having at least two distributor blocks prior to connection to the at least one interface; and defining a second configuration of the fluidic line matrix different from the configuration of the fluidic line matrix by connecting a second distributor block of the at least two distributor blocks in place or in exchange of a first distributor block of the at least two distributor blocks.

* * * * *